(12) United States Patent
Schwab et al.

(10) Patent No.: US 7,538,173 B2
(45) Date of Patent: May 26, 2009

(54) POLYOLEFIN COMPOSITIONS

(75) Inventors: Thomas J. Schwab, Loveland, OH (US); Jean A. Merrick-Mack, West Chester, OH (US); Wallace W. Yau, Mason, OH (US); Kelly L. Williams, Maineville, OH (US)

(73) Assignee: Equistar Chemicals LP, Houston, TX (US)

( * ) Notice: Subject to any disclaimer, the term of this patent is extended or adjusted under 35 U.S.C. 154(b) by 256 days.

(21) Appl. No.: 11/283,662

(22) Filed: Nov. 21, 2005

(65) Prior Publication Data

US 2007/0117946 A1    May 24, 2007

(51) Int. Cl.
*C08F 210/02* (2006.01)
*C08F 210/16* (2006.01)

(52) U.S. Cl. .............. 526/348.1; 526/348; 526/160; 526/161; 526/172

(58) Field of Classification Search ............ 526/348, 526/348.1, 160, 161, 172
See application file for complete search history.

(56) References Cited

U.S. PATENT DOCUMENTS

| | | | | |
|---|---|---|---|---|
| 6,232,260 | B1 | 5/2001 | Nagy et al. | 502/155 |
| 6,451,724 | B1 | 9/2002 | Nifant'ev et al. | 502/103 |
| 6,469,103 | B1 * | 10/2002 | Jain et al. | 525/240 |
| 6,815,023 | B1 * | 11/2004 | Tatarka et al. | 428/34.9 |
| 6,908,972 | B2 * | 6/2005 | Tsuie et al. | 526/160 |
| 2002/0007034 | A1 * | 1/2002 | Cotts et al. | 526/352 |
| 2003/0065097 | A1 | 4/2003 | DeGroot et al. | 525/240 |
| 2003/0088037 | A1 | 5/2003 | Stevens et al. | 526/65 |
| 2003/0195306 | A1 * | 10/2003 | Tsuie et al. | 526/127 |

OTHER PUBLICATIONS

W. Yau & D. Gillespie, *Polymer* 42 (2001) 8947, "New approaches using MW-sensitive detectors in GPC-TREF for polyolefin characterization".
W. Yau, *Tappi 2005 Place Conference Proceedings*, Tappi Press, Atlanta, Session 19, Paper 19-1.
C. T. Enos, K. Rufener, J. Merrick-Mack, W. Yau, *Water International GPC Symposium Proceedings*, Jun. 6-12, 2003, Baltimore, MD.
R. N. Shroff and H. Mavridis, "Long-Chain-Branching Index For Essentially Linear Polyethylenes." *Macromolecules* 32 (1999) 8454.
C. G. Robertson, et al., "Extent of Branching from Linear Viscoelasticity of Long-Chain-Branched Polymers", *J. Polym. Sci. B: Polym. Phys.* 42 (2004) 1671.
Wang, W-J et al., *Elsevier, Polymer* 45 (2004) 6495-6505.
Tso, C.C. et al., *Elsevier, Polymer* 45 (2004) 2657-2663.
Gupta et al., *Elsevier, Polymer* 46 (2005) 8819-8837.
Villar, M.A., *Elsevier, Polymer* 42 (2001) 9269-9279.

* cited by examiner

*Primary Examiner*—Roberto Rábago
(74) *Attorney, Agent, or Firm*—Jonathan L. Schuchardt

(57) ABSTRACT

Ethylene copolymers valuable for films, coatings, sheets, and molded articles are disclosed. Some of the copolymers have a long-chain-branching index from 0.25 to 0.60 and a gpcBR index from 0.1 to 0.7. Others have a primary DSC melting point that is less than its secondary DSC melting point. Also disclosed is LLDPE in which the weight percentage of the low-temperature elution fraction exceeds that of the high-temperature fraction, and wherein the $M_w$ of the low-temperature fraction exceeds that of the high-temperature fraction. The ethylene copolymers process easily, even at low melt indices, and films from the copolymers have high stiffness, good impact resistance, and high heat-seal strength over a wide temperature range.

11 Claims, No Drawings

POLYOLEFIN COMPOSITIONS

FIELD OF THE INVENTION

The invention relates to ethylene copolymers, including linear low density polyethylenes, and films made from the copolymers.

BACKGROUND OF THE INVENTION

Most commercial polyethylene is produced using Ziegler-Natta catalysts, but polymers made from single-site catalysts, including metallocenes, are gaining market acceptance. While metallocene-based polyethylene resins (m-PE) can provide films and other articles with superior physical properties, they can lack the processability advantages of Ziegler resins. The processability of m-PE can be enhanced by introducing long-chain branching, but so far, only limited progress has been achieved. In contrast, low density polyethylene (LDPE), which is used for extrusion coatings, sheets, blow-molded articles, and some films is highly branched. Unfortunately, this amount of branching is too much for many film applications. Moreover, LDPE is produced using a high-pressure process rather than the solution, slurry, or gas-phase phase processes that now dominate the industry for making linear low density polyethylenes (LLDPE).

Single-site catalysts based on transition metal indenoindolyl complexes are known (see, e.g., U.S. Pat. Nos. 6,232,260 and 6,451,724). Indenoindolyl complexes are versatile because a wide variety of indanone and arylhydrazine precursors can be used to produce the ligand precursors. Thus, substituent effects can be exploited and catalyst structure can be altered to produce improved polyolefins. However, exploiting the versatility of indenoindolyl complexes demands an appreciation of the interrelationship among resin properties.

We have described an analytical approach that bridges the gap between gel permeation chromatography (GPC) and rheology-based information (see W. Yau and D. Gillespie, *Polymer* 42 (2001) 8947; W. Yau, *TAPPI 2005 PLACE Conference Proceedings*, TAPPI Press, Atlanta, Session 19, Paper 19-1; and C. Enos, K. Rufener, J. Merrick-Mack, and W. Yau, *Waters International GPC Symposium Proceedings*, Jun. 6-12, 2003, Baltimore, Md.) In particular, we utilized a combination of 3D-GPC and 3D-TREF (temperature rising elution fractionation) techniques that use on-line light-scattering, intrinsic viscosity, and concentration (refractometer or infrared) detectors. The techniques provide detailed information about polymer microstructure and enable detection of subtle differences in polymer molecular weight, molecular weight distribution, short-chain branching, and long-chain branching. As we explained, long-chain-branching index (LCBI) values obtained from rheology can be correlated with a GPC-based measure of long-chain branching called gpcBR. Particularly when viewed with information such as differential scanning calorimetry (DSC) melting points, density, and melt indices, the 3D-GPC and 3D-TREF techniques are valuable tools for characterizing polyolefin resins.

Identifying resin characteristics that translate into improved films, coatings, sheets, and molded articles is a continuing challenge. It would be valuable, for example, to find resins that provide good impact resistance and high heat-seal strength over a wide temperature range. Ideally, even high-molecular-weight resins could be extruded at low pressures to allow for increased film production rates. The industry would benefit from unique resins that combine attributes of essentially linear polyethylenes (e.g., m-LLDPE) and more highly branched ones (e.g., LDPE) with the processability advantages of Ziegler-Natta resins.

SUMMARY OF THE INVENTION

The invention relates to ethylene copolymers that are valuable for films, coatings, sheets, and molded articles. In one aspect, the invention is an ethylene copolymer having a long-chain-branching index from 0.25 to 0.60 and a gpcBR index from 0.1 to 0.7.

The invention includes ethylene copolymers having a primary DSC melting point that is less than its secondary DSC melting point. Further included are ethylene copolymers comprising, by 3D-TREF analysis, at least 80 wt. % of a polymer component having an Mw from 100,000 to 130,000 and an elution temperature range from 40° C. to 85° C.

In yet another aspect, the invention relates to LLDPE having, by 3D-TREF analysis, relatively low- and high-temperature elution fractions, wherein the weight percentage of the low-temperature fraction exceeds that of the high-temperature fraction, and wherein the $M_w$ of the low-temperature fraction exceeds that of the high-temperature fraction.

Ethylene copolymers of the invention are easy to process, even at low melt indices, and they provide films with high stiffness, good impact resistance, and high heat-seal strength over a wide temperature range.

DETAILED DESCRIPTION OF THE INVENTION

Ethylene copolymers of the invention incorporate recurring units derived from ethylene and one or more α-olefins. Preferred α-olefins include, for example, propylene, 1-butene, 1-hexene, 1-octene, 2-methyl-1-pentene, styrene, and the like, and mixtures thereof. Copolymers of ethylene with 1-butene, 1-hexene, 1-octene, or mixtures thereof are preferred.

The ethylene copolymers are preferably medium to low density materials, generally known as MDPE or LLDPE. Preferably, the copolymers have a density as measured by ASTM method D2839 from 0.90 to 0.94 g/cm³, more preferably from 0.90 to 0.92 g/cm³. Preferred ethylene copolymers have a melt index ($MI_2$ as determined by ASTM method D1238, 2.16 kg load) in the range of 0.5 to 3 g/10 min., more preferably from 0.6 to 1.2 g/10 min.

In one aspect, the invention is an ethylene copolymer having measurable long-chain branching. Long-chain-branching index (LCBI) is a rheological index used to characterize low levels of long-chain branching in essentially linear polyethylenes. LCBI is defined as:

$$LCBI = \frac{\eta_0^{0.179}}{4.8 \cdot [\eta]} - 1$$

where $\eta_0$ is the limiting, zero-shear viscosity (Poise) at 190° C. and $[\eta]$ is the intrinsic viscosity in trichlorobenzene at 135° C. (dL/g). LCBI is based on observations that low levels of long-chain branching, in an otherwise linear polymer, result in a large increase in melt viscosity, $\eta_o$, with a much smaller change in intrinsic viscosity, [η]. See R. N. Shroff and H. Mavridis, "Long-Chain-Branching Index for Essentially Linear Polyethylenes," *Macromolecules* 32 (1999) 8454. A higher LCBI means a greater number of long-chain branches per polymer chain or longer branches on a main polymer chain.

Some ethylene copolymers of the invention have an LCBI from 0.25 to 0.60, more preferably from 0.30 to 0.55, which indicates a significant level of long-chain branching. In contrast, commercial LDPE generally has a high level of long-chain branching (LCBI>1; see Table 1, Comparative Example 5), and Ziegler-Natta or metallocene-based LLDPE typically has little or no long-chain branching (LCBI<0.1; see Table 1, Comparative Examples 6 and 7).

In another aspect, the invention is an ethylene copolymer having a gel permeation chromatography branching index, hereinafter "gpcBR," within the range of 0.1 to 0.7, preferably from 0.12 to 0.20. The gpcBR index is calculated from the bulk light scattering (LS) weight average molecular weight, bulk intrinsic viscosity, and their linear equivalents from conventional GPC calculations. This index can be used not only for LDPE polymers, but also for copolymers and essentially linear polymers. Because the bulk weight average molecular weight from on-line light scattering and the bulk intrinsic viscosity from an on-line viscometer are both free from small errors in baseline endpoints, the gpcBR index is precise, allowing the ranking of polymers with much lower levels of long-chain branching than previously possible by GPC techniques.

The value of gpcBR is given by:

$$gpcBR = \left(\frac{M_{w,b}}{M_{w,L}}\right)^a \times \left(\frac{[\eta]_L}{[\eta]_b}\right) - 1$$

where $M_{w,b}$ is the bulk weight average molecular weight by light scattering, $M_{w,L}$ is the weight average molecular weight calculated from the concentration detector GPC curve assuming a linear polymer structure, $[\eta]_b$ is the bulk intrinsic viscosity by online viscosity detector, $[\eta]_L$ is the intrinsic viscosity calculated from the concentration detector GPC curve assuming a linear polymer structure using the Mark-Houwink constants, K and α, for linear polyethylene, and α is a Mark-Houwink constant for linear polyethylene. For more details about theoretical aspects of gpcBR index, see C. Enos et al., supra.

The invention includes ethylene copolymers having at least two distinguishable melting points by differential scanning calorimetry (DSC). The primary (1°) DSC melting point is the peak melting temperature of the major sample fraction, and the secondary (2°) DSC melting point is the peak melting temperature of any minor sample fraction. In preferred ethylene copolymers of the invention, the primary DSC melting point is less than the secondary DSC melting point. In preferred ethylene copolymers of the invention, the primary DSC melting point is less than 105° C. and the secondary DSC melting point is greater than 110° C.

In each of Examples 1-4 (Table 1, below), the major polymer fraction has a DSC melting point that is less than the DSC melting point of the minor polymer fraction. For instance, in Example 1, the major polymer fraction has a DSC melting point of 102° C., while the minor fraction has a DSC melting point of 119° C. In contrast, the primary DSC melting point exceeds the secondary DSC melting point in other commercial products, including LLDPE made using Ziegler-Natta or metallocene catalysts (Comparative Examples 6 and 7).

In another aspect, the invention relates to ethylene copolymers that comprise by 3D-TREF analysis a major portion, preferably at least 80 wt. %, of a polymer component that has a weight average molecular weight ($M_w$) in the range of 100,000 to 130,000 and an elution temperature range from 40° C. to 85° C. By "3D-TREF," we mean an analytical technique known as temperature rising elution fractionation in a triple detector setup, i.e., one utilizing on-line light-scattering, intrinsic viscosity, and concentration (refractometer or infrared) detectors. Each composition fraction is measured simultaneously using each of the three detector types. TREF relies on the crystallization and redissolution process to separate polymers having differing levels of short-chain branching. For more details about how to use the 3D-TREF technique, see W. Yau and D. Gillespie, *Polymer* 42 (2001) 8947 and references cited therein.

For instance, as shown in Table 2, certain ethylene copolymers of the invention, when analyzed by 3D-TREF, exhibited a major fraction (85-91 wt. %) of polymer in the 40-85° C. elution fraction. Moreover, this component consistently had a $M_w$ in the range of 100K to 130K. In contrast, while commercial LDPE also had a major fraction of polymer in the 40-85° C. fraction, it also had a much higher $M_w$ of 434K (see Comparative Example 5). A metallocene-based LLDPE sample had an $M_w$ of 120K (i.e., within the 100-130K range), but it had a major fraction of polymer (42 wt. %) in the 85-110° C. fraction (Comparative Example 7).

Certain ethylene copolymers of the invention exhibit a region of nearly frequency-independent (or complex modulus-independent) phase angle which has been shown to characterize polymers with sparse to intermediate levels of long-chain branching (see C. G. Robertson et al., *J. Polym. Sci. B: Polym. Phys.* 42 (2004) 1671). Phase angle (δ) and complex modulus (G*) are measured over the frequency range and plots δ of versus G* are generated. For copolymers of the invention, a plot of phase angle versus G* exhibits a plateau in phase angle at some value between 0 and 90°, especially when G* has a value within the range of $2 \times 10^4$ to $1 \times 10^6$ dyn/cm$^2$. Preferably, the plateau occurs at a phase angle of at least 50° and less than 70° within this G* range. In contrast, each of Ziegler-Natta based LLDPE, metallocene-based LLDPE, and LDPE exhibits a rapidly increasing value of phase angle at the lower G* value over the same range of G* (see Table 2).

Certain ethylene copolymers of the invention have complex viscosities (η*) at 0.1 rad/sec in the range of $1.0 \times 10^5$ to $2.5 \times 10^5$ poise. These polymers also have η* at 100 rad/sec in the range of $1.1 \times 10^4$ to $1.7 \times 10^4$ poise (see Table 2, Examples 1-4).

In one aspect, the invention relates to ethylene copolymers made using catalysts that incorporate indenoindolyl complexes. The synthesis of these catalysts and their use in making ethylene copolymers has already been described. See, e.g., U.S. Pat. Nos. 6,232,260 and 6,451,724, the teachings of which are incorporated herein by reference. In a particularly preferred aspect, the catalyst is a bridged indeno[2,1-b]indolyl Group 3-10 metal complex, more preferably a bridged indeno[2,1-b]indolyl Group 4 metal complex. The complex can be, for example, a dimethylsilyl-bridged cyclopentadienyl(indeno[2,1-b]indolyl)-zirconium dichloride such as complex 1:

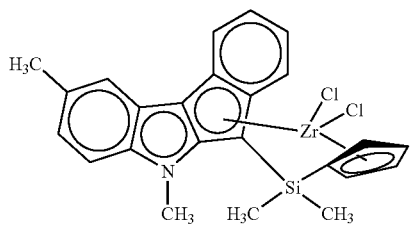

The invention includes ethylene copolymers that are linear low density polyethylenes (LLDPE) having relatively low- and high-temperature 3D-TREF elution fractions. In these copolymers, the weight percentage of the low-temperature fraction exceeds that of the high-temperature fraction, and the $M_w$ of the low-temperature fraction exceeds that of the high-temperature fraction. As Table 2 shows, Examples 1-4 have more of the low-temperature fraction (40-85° C.) compared with the amount of high-temperature fraction (85-110° C.). The metallocene-based LLDPE product (Comparative Example 7), had more of high- than low-temperature fraction.

Preferred ethylene copolymers of the invention process well, even at relatively low melt indices. As shown in Table 3, a copolymer of the invention processed at a lower pressure compared with either a Ziegler-Natta based LLDPE (Comparative Example 10) or LLDPE made with a constrained-geometry catalyst (Comparative Example 11) even though the copolymer of the invention had a lower melt index than either of the comparative copolymer resins.

The invention includes films made from the ethylene copolymers. The films have good impact resistance, high stiffness, and high heat-seal strength. Table 3 (Example 9) shows the good stiffness (machine-direction modulus=14,600 psi) and good impact resistance (Dart drop>1950 g) for films made with a copolymer of the invention. As shown in Table 4, the same copolymer also provides films having superior heat-seal strength over a wide temperature range when compared with films made from Ziegler-Natta based LLDPE or LLDPE made using a constrained-geometry catalyst.

The following examples merely illustrate the invention. Those skilled in the art will recognize many variations that are within the spirit of the invention and scope of the claims.

EXAMPLES 1-4

Preparation of Ethylene Copolymers

Each of the copolymers for Examples 1-4 is produced on a pilot-scale, single slurry-loop reactor using a silica-supported dimethylsilyl-bridged cyclopentadienyl(indeno[2,1-b]indolyl)zirconium dichloride complex, 1. The complex is generally prepared and supported by the method of U.S. Pat. No. 6,908,972 (see Examples 3 and 10). A toluene solution of MAO, complex, and F15 activator is added to MAO-treated silica using an incipient-wetness technique as previously described to give a free-flowing powder. Density and melt index targets are adjusted by controlling temperatures, feed rates, comonomer level, and hydrogen concentration. The resulting polyethylene powder is combined with an antioxidant package and pelletized prior to determining physical properties (see Table 1).

Run conditions: catalyst cycle time (s): 90-280; diluent: isobutane, at feed rate 88-160 pph; temperature: 165-170° F.; 1-hexene/ethylene molar ratio: 0.29-0.33; 1-hexene feed ratio (lb./lb. ethylene): 0.28-0.40; hydrogen (25% in nitrogen) feed rate (pph): 0.070-0.123; alkylaluminum: none; residence time (h): 0.8-1.1; antistatic agent: Stadis 424 additive (product of Akzo Nobel), 40 ppm.

Analytical Methods

1. Triple-Detector Gel Permeation Chromatography (3D-GPC)

All GPC analyses are performed on a Waters GPC2000CV equipped with a differential refractometer, triple capillary viscometer, and a dual-angle light scattering detector (from Precision Detectors). Two analytical columns (mixed bed LS, from Polymer Labs) and a guard column are used with 1,2,4-trichlorobenzene (TCB) at 145° C. at a nominal flow rate of 1.0 mL/min.

Samples are prepared by dissolving 6-8 mg of material in TCB (3.7 mL) for 1 h at 175° C. with manual agitation at 30-minute intervals. The TCB solvent contains about 800 ppm of BHT. All calculations are performed using Waters Empower GPC software equipped with the light scattering option. Conventional calibration curves are generated using an in-house broad polyethylene standard and the cumulative matching % calibration procedure.

2. Triple-Detector Temperature Rising Elution Fractionation (3D-TREF)

A hybrid system is built by installing a TREF add-on oven compartment to an existing Waters 2000CV GPC system with a built-in refractive index detector and viscometer. Two additional detectors are added to the system. These are the PolymerChar IR4 detector and the PDI-2040 light scattering detector with 15 and 90-degree dual-angle capability. A six-port valve is added to the system to automatically switch the solvent flow through either the GPC columns or the TREF columns at pre-determined set times. A non-commercial TREF column packed with glass beads is used with TCB at 145° C. at a nominal flow rate of 0.5 mL/min.

Samples are prepared by dissolving 6-8 mg of material in TCB (3.7 mL) for 1 h at 175° C. with manual agitation at 30-minute intervals: The TCB solvent contains about 1000 ppm of BHT. All data processing is performed using an in-house calculation module.

3. Dynamic Oscillatory Rheology

Rheological measurements are obtained with a Rheometrics RDAII instrument at 190° C. under nitrogen, using 25-50 mm parallel plates, strains between 10-20%, and a frequency range ($\omega$) of 0.025 to 400 rad/s. The plate size and strain are selected, based on polymer viscosity, to maintain sufficient torque response while ensuring that measurements are within the linear viscoelastic region for the resin type. Phase angle ($\delta$) and complex modulus ($G^*$) are measured over the frequency range and from these are derived the storage modulus ($G'=G^*\cos(\delta)$), loss modulus ($G''=G^*\sin(\delta)$), and complex viscosity ($\eta^*=G^*/\omega$).

4. Differential Scanning Calorimetry (DSC)

Polymer melting points are determined using a Perkin Elmer Pyris 1 differential scanning calorimeter. Samples are first heated to 160° C. and held for 5 minutes, then cooled to 0° C. at a rate of 5° C./minute, then heated a second time to 160° C. at a rate of 10° C./minute. The melting points reported herein (see Table 1) are from the second heating cycle.

The preceding examples are meant only as illustrations. The following claims define the invention.

TABLE 1

Resin Properties

| Ex | Polymer Type | MI (g/10 min) | Density (g/cm$^3$) | LCBI[1] | gpcBR[2] | 1° Mp (° C.) (by DSC) | 2° Mp (° C.) (by DSC) |
|---|---|---|---|---|---|---|---|
| 1 | A | 0.6 | 0.914 | 0.56 | 0.18 | 102 | 119 |
| 2 | A | 1.0 | 0.911 | 0.27 | 0.14 | 101 | 115 |
| 3 | A | 0.8 | 0.909 | 0.47 | 0.14 | 103 | 112 |
| 4 | A | 0.8 | 0.905 | 0.43 | 0.16 | 98 | 112 |
| C5 | B | 0.2 | 0.918 | 1.3 | 1.9 | 110 | — |
| C6 | C | 1.0 | 0.912 | 0.04 | 0.08 | 123 | 119 |
| C7 | D | 1.1 | 0.919 | −0.1 | −0.06 | 120 | 110 |
| C8 | E | 1.0 | 0.911 | 0.32 | 0.08 | 107 | — |

A = inventive polymer made using Me$_2$Si-bridged cyclopentadienyl(indeno[2,1-b]indolyl)zirconium dichloride complex
B = commercial LDPE
C = commercial LLDPE made using Ziegler-Natta catalyst
D = metallocene-based LLDPE
E = LLDPE made using a constrained-geometry catalyst
[1]LCBI = long-chain-branching index.
[2]gpcBR is an index derived from the ratio of the expected to the measured solutionintrinsic viscosities.

TABLE 2

Resin Properties

| Ex | Polymer Type | MI (g/10 min.) | Density (g/cm$^3$) | TREF Fraction <40° C. Wt % | TREF Fraction <40° C. $M_W$ | TREF Fraction 40-85° C. Wt % | TREF Fraction 40-85° C. $M_W$ | TREF Fraction 85-110° C. Wt % | TREF Fraction 85-110° C. $M_W$ | η* (poise) at 0.1 rad/s | η* (poise) at 100 rad/s | δ (°) at G* = 2 × 10$^4$ dyn/cm$^2$ | δ (°) at G* = 1 × 10$^6$ dyn/cm$^2$ |
|---|---|---|---|---|---|---|---|---|---|---|---|---|---|
| 1 | A | 0.6 | 0.914 | 4 | 44 | 87 | 124 | 9 | 70 | 2.2 × 10$^5$ | 1.6 × 10$^4$ | 62 | 52 |
| 2 | A | 1.0 | 0.911 | 7 | 63 | 89 | 107 | 4 | 76 | 1.1 × 10$^5$ | 1.4 × 10$^4$ | | |
| 3 | A | 0.8 | 0.909 | 7 | 63 | 91 | 107 | 2 | 83 | 1.6 × 10$^5$ | 1.1 × 10$^4$ | | |
| 4 | A | 0.8 | 0.905 | 14 | 66 | 85 | 115 | 1 | — | 1.7 × 10$^5$ | 1.7 × 10$^4$ | | |
| C5 | B | 0.2 | 0.918 | 7 | 7 | 92 | 434 | 1 | — | 4.7 × 10$^5$ | 8.7 × 10$^3$ | 58 | 30 |
| C6 | C | 1.0 | 0.912 | 17 | 77 | 60 | 105 | 23 | 177 | 9.5 × 10$^4$ | 1.6 × 10$^4$ | 82 | 52 |
| C7 | D | 1.1 | 0.919 | 1 | — | 27 | 120 | 42 | 103 | 7.1 × 10$^4$ | 2.4 × 10$^4$ | 86 | 64 |
| C8 | E | 1.0 | 0.911 | 5 | 62 | 95 | 93 | 0 | — | 1.3 × 10$^5$ | 1.4 × 10$^4$ | 76 | 55 |

A = inventive polymer made using Me$_2$Si-bridged cyclopentadienyl(indeno[2,1-b]indolyl)zirconium dichloride complex
B = commercial LDPE
C = commercial LLDPE made using Ziegler-Natta catalyst
D = metallocene-based LLDPE
E = LLDPE made using a constrained-geometry catalyst
Mw in thousands.

TABLE 3

Resin Processability and Film Properties

| Ex # | Polymer from Ex # | Polymer Type | MI[1] (g/10 min) | Density[2] (g/cm$^3$) | Comonomer | Extruder Pressure (psi) | MD Modulus[3] (psi) | Dart Drop[4] (g) |
|---|---|---|---|---|---|---|---|---|
| 9 | 3 | A | 0.8 | 0.909 | 1-hexene | 2030 | 14,600 | >1950 |
| C10 | C6 | C | 1.0 | 0.912 | 1-octene | 2330 | 18,100 | >1950 |
| C11 | C8 | E | 1.0 | 0.911 | 1-octene | 2140 | 15,000 | >1950 |

A = inventive polymer made using Me$_2$Si-bridged cyclopentadienyl(indeno[2,1-b]indolyl)zirconium dichloride complex
C = commercial LLDPE made using Ziegler-Natta catalyst
E = LLDPE made using a constrained-geometry catalyst
ASTM methods: [1]D1238; [2]D2839; [3]E111; [4]D1709.

TABLE 4

Heat Seal Strength of Films

| Polymer from | | | Heat Seal Strength[1] (foot-pounds) vs. Temperature (° C.) | | | | | |
|---|---|---|---|---|---|---|---|---|
| Ex # | Ex # | Polymer Type | 190° C. | 195° C. | 200° C. | 205° C. | 210° C. | 215° C. |
| 9 | 3 | A | 0.8 | 1.2 | — | 1.9 | 2.2 | 2.6 |
| C10 | C6 | C | 0.2 | 1.1 | 1.2 | 1.5 | 1.6 | 1.7 |
| C11 | C8 | E | — | 0.5 | — | 1.4 | 1.7 | 2.1 |

A = inventive polymer made using Me$_2$Si-bridged cyclopentadienyl(indeno[2,1-b]indolyl)zirconium-dichloride complex
C = commercial LLDPE made using Ziegler-Natta catalyst
E = LLDPE made using a constrained-geometry catalyst
ASTM method: [1]D882/F88. Film thickness: 1 mil; pressure: 40 psi; seal time: 0.5 s.

We claim:

1. An ethylene copolymer having a density from 0.90 to 0.94 g/cm$^3$, a melt index from 0.5 to 3 g/10 min, a long-chain-branching index from 0.25 to 0.60, and a gpcBR index within the range of 0.12 to 0.20.

2. The copolymer of claim 1 having primary and secondary DSC melting points corresponding to the peak melting temperature of, respectively, major and minor sample fractions; wherein the primary DSC melting point is less than the secondary DSC melting point.

3. The copolymer of claim 1 prepared using a bridged indeno[2,1-b]indolyl Group 3-10 metal complex.

4. A film produced from the ethylene copolymer of claim 1.

5. An ethylene copolymer having a density from 0.90 to 0.94 g/cm$^3$, a melt index from 0.5 to 3 g/10 min, and primary and secondary DSC melting points corresponding to the peak melting temperature of, respectively, major and minor sample fractions; wherein the primary DSC melting point is less than the secondary DSC melting point; said copolymer having a phase angle less than 70° at complex modulus, G*=2×10$^4$ dynes/cm$^2$ and at least 50° at G*=1×10$^6$ dynes/cm$^2$.

6. A film produced from the ethylene copolymer of claim 5.

7. An ethylene copolymer having a density from 0.90 to 0.94 g/cm$^3$ and a melt index from 0.5 to 3 g/10 min, wherein the copolymer comprises, by 3D-TREF analysis, at least 80 wt.% of a polymer component having a weight average molecular weight, M$_w$, from 100,000 to 130,000 and an elution temperature range from 40° C. to 85° C.

8. The copolymer of claim 7 having a complex viscosity, η*, at 0.1 rad/sec in the range of 1.0×10$^5$ to 2.5×10$^5$ poise and η* at 100 rad/sec in the range of 1.1×10$^4$ to 1.7×10$^4$ poise.

9. The copolymer of claim 7 having a phase angle, δ, less than 70° at complex modulus, G*=2×10$^4$ dynes/cm$^2$ and at least 50° at G*=1×10$^6$ dynes/cm$^2$.

10. The copolymer of claim 7 prepared using a bridged indeno[2,1-b]indolyl Group 3-10 metal complex.

11. A film produced from the ethylene copolymer of claim 7.

* * * * *